United States Patent [19]

Carson

[11] 4,351,197

[45] Sep. 28, 1982

[54] PRECISION POSITIONING APPARATUS HAVING A ROTATING DRIVING ELEMENT AND A ROTATING DRIVEN ELEMENT

[76] Inventor: Donald G. Carson, 12108 Towner Ave., NE., Albuquerque, N. Mex. 87112

[21] Appl. No.: 294,225

[22] Filed: Aug. 19, 1981

[51] Int. Cl.³ .................. F16H 27/02; F16H 29/02
[52] U.S. Cl. .................. 74/89.22; 74/10.7; 74/506; 474/64
[58] Field of Search .......... 74/10.7, 89.2, 89.21, 74/89.22, 96, 496, 505, 506; 474/64–68, 148

[56] References Cited

U.S. PATENT DOCUMENTS

| 425,543 | 4/1890 | Hillstrom | 474/67 |
| 1,441,145 | 1/1923 | Daigle | 74/506 |
| 2,516,092 | 7/1950 | Roessler | |
| 2,787,169 | 4/1957 | Farr et al. | 74/506 |
| 3,194,080 | 7/1965 | Olson | 74/10.7 |
| 3,874,246 | 4/1975 | Woodard | 474/64 |
| 4,210,094 | 7/1980 | Kondo | 74/10.7 |
| 4,236,696 | 12/1980 | Hicks et al. | 74/750 R |

FOREIGN PATENT DOCUMENTS

| 923442 | 2/1955 | Fed. Rep. of Germany | 74/10.7 |
| 942040 | 4/1956 | Fed. Rep. of Germany | 74/10.7 |
| 1038134 | 9/1958 | Fed. Rep. of Germany | 74/10.7 |
| 875390 | 8/1961 | United Kingdom | 74/10.7 |

*Primary Examiner*—Lawrence J. Staab
*Attorney, Agent, or Firm*—H. Gordon Shields

[57] ABSTRACT

Precision positioning apparatus includes a rotatable driving element connected to a rotatable driven element having a diameter substantially greater than that of the driven element, and rotary movement of the driving element imparts rotary movement to the driven element. The diameters of the two elements are related so that a relatively large movement of the driving element results in a relatively small movement of the driven element, and vice versa.

15 Claims, 14 Drawing Figures

PRECISION POSITIONING APPARATUS HAVING A ROTATING DRIVING ELEMENT AND A ROTATING DRIVEN ELEMENT

BACKGROUND OF THE INVENTION

1. Field of the Invention

This invention relates to positioning apparatus, and, more particularly, to precision positioning apparatus in which a driving element is rotatably connected to a driven element for the positioning of the driven element.

2. Description of the Prior Art

The rotary positioning of various types of apparatus may be accomplished by various methods, such as the manual positioning by rotating manually an element to be positioned, or a mechanical positioning system may be used. In a mechanical system, some type of mechanical connection, such as through a gearing system, may be used by which an element, a driving element, may be connected to another element, a driven element, through a system of gears for changing the ratio of the angular movement of the driving element with respect to the angular movement of the driven element. With a substantial difference between the diameters of the two elements, there is achieved a substantial degree of control over the precise positioning of the positioning element. This is, of course, directly related to the ratio of the diameters of the two elements. In this case, the result of the connection of the two elements is also a substantial reduction in the speed of the driven element with respect to the speed of the driving element.

There are basically two types of drive systems, direct and indirect. An electric motor may be used to position an apparatus directly, as when the apparatus is secured by direct connection to the rotating armature of an electric motor, or it may be used to position an apparatus indirectly through a mechanical linkage system, such as a gear, or belt, or cable system. An electric motor, a hydraulic motor, or some other appropriate prime motor may be connected to the driving element.

In U.S. Pat. No. 2,516,092, an electric motor is used to drive a drum around which a cable extends. The cable is connected between a driving drum to which the motor is connected and a remote, driven drum. Rotary movement of the driving drum is imparted to the driven drum through a cable system. The apparatus of the '092 patent is used to move a pointer parallel to a scale which includes calibration marks. The scale is fixed, and rotation of the two drums is accordingly indicated by movement of the pointer. The pointer provides a visual indication of the relationship of the driven drum with respect to a fixed reference point.

SUMMARY OF THE INVENTION

The invention described and claimed herein comprises precision positioning apparatus including a driving element and a driven element connected by a cord disposed about both the driving element and driven element for the control of movement of the driven element by the driving element, and for the reduction of rotational speed of the driven element with respect to the rotational speed of the driving element, or vice versa.

Among the objects of the present invention are the following:

To provide new and useful positioning apparatus;

To provide new and useful rotary drive speed reduction apparatus;

To provide a new and useful positioning element having a driving element and a driven element; and To provide new and useful positioning apparatus in which a driving element is connected to a driven element by a flexible cord wound about the periphery of both the driving and the driven elements.

DESCRIPTION OF THE PREFERRED EMBODIMENT

Figures 1, 2, 3A, 3B, 4:
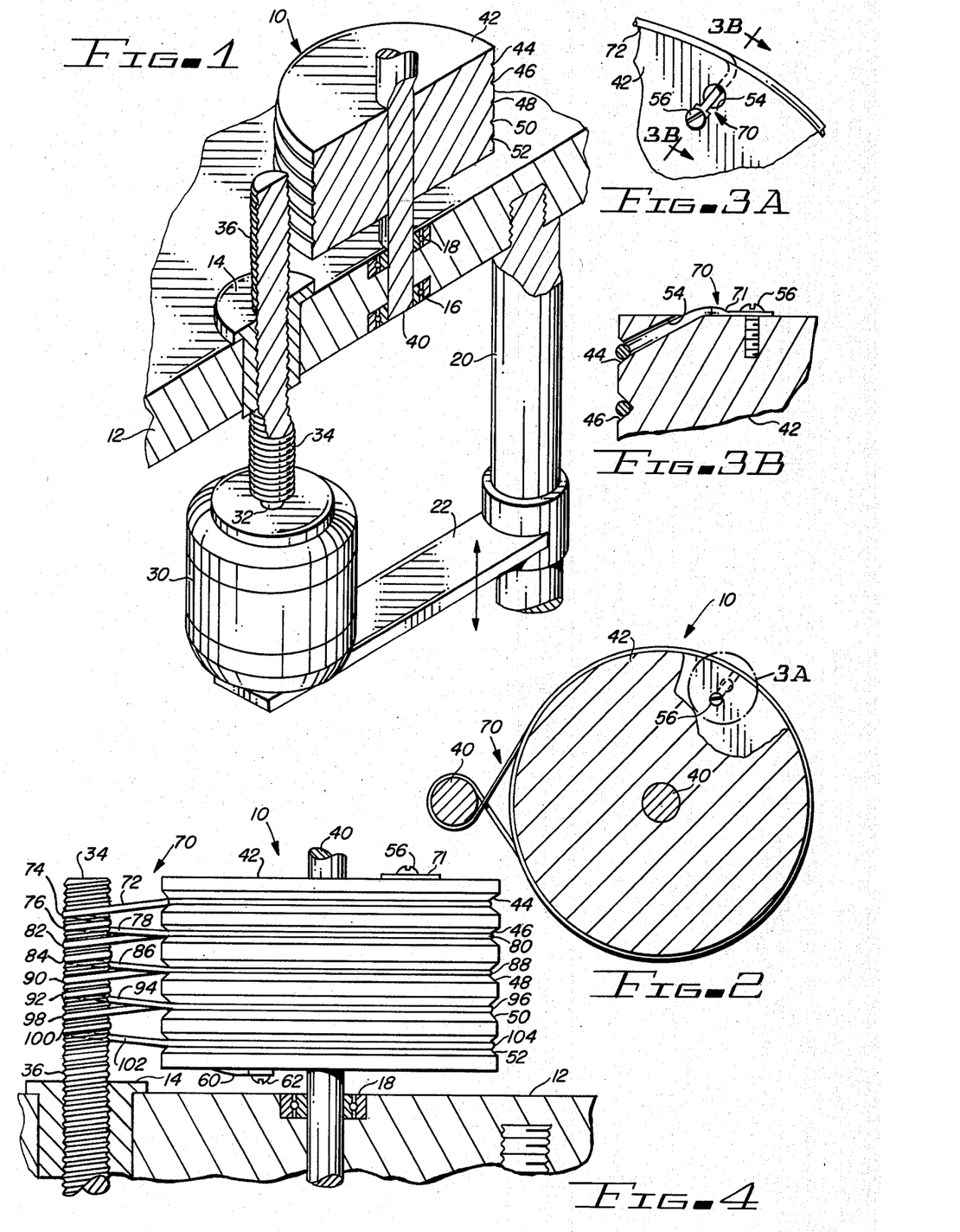
FIG. 1 is a perspective view, with a portion cut away, of the apparatus of the present invention.
FIG. 2 is a top view of the apparatus of FIG. 1.
FIG. 3A is an enlarged view of a portion of the apparatus of FIG. 2, taken generally from circle 3A of FIG. 2.
FIG. 3B is a view in partial section of the apparatus of FIG. 3A taken generally along line 3B—3B of FIG. 3A.
FIG. 4 is a side view, in partial section, of a portion of the apparatus of FIG. 1.

FIG. 1 comprises a perspective view in partial section of positioning apparatus 10 of the present invention. The positioning apparatus 10 includes a base 12. Three elements are secured to the base 12, including a tapped nut 14, a support 20, and a shaft 40. The shaft 40 is appropriately rotatably secured to the base 12 through bearings 16. The element 20 comprises a support shaft to which is secured a flexure 22 remote from the base 12. A motor 30 is in turn secured to the flexure 22. The motor includes an output shaft 32 which is secured in turn to a threaded shaft 34. The threaded shaft 34 comprises a lead screw which extends through the tapped nut 14. The screw 34 includes a plurality of threads 36. The lead screw 34 comprises the driving element for the apparatus of the present invention.

A driven element or drum 42 is secured to the shaft 40. The lead screw 34 and the driven element 42 are coupled for joint rotation, with the motor 30 providing the motive power for moving the driving element or lead screw 34, rotation of which in turn causes rotation of the driven element 42.

Figure 1A:
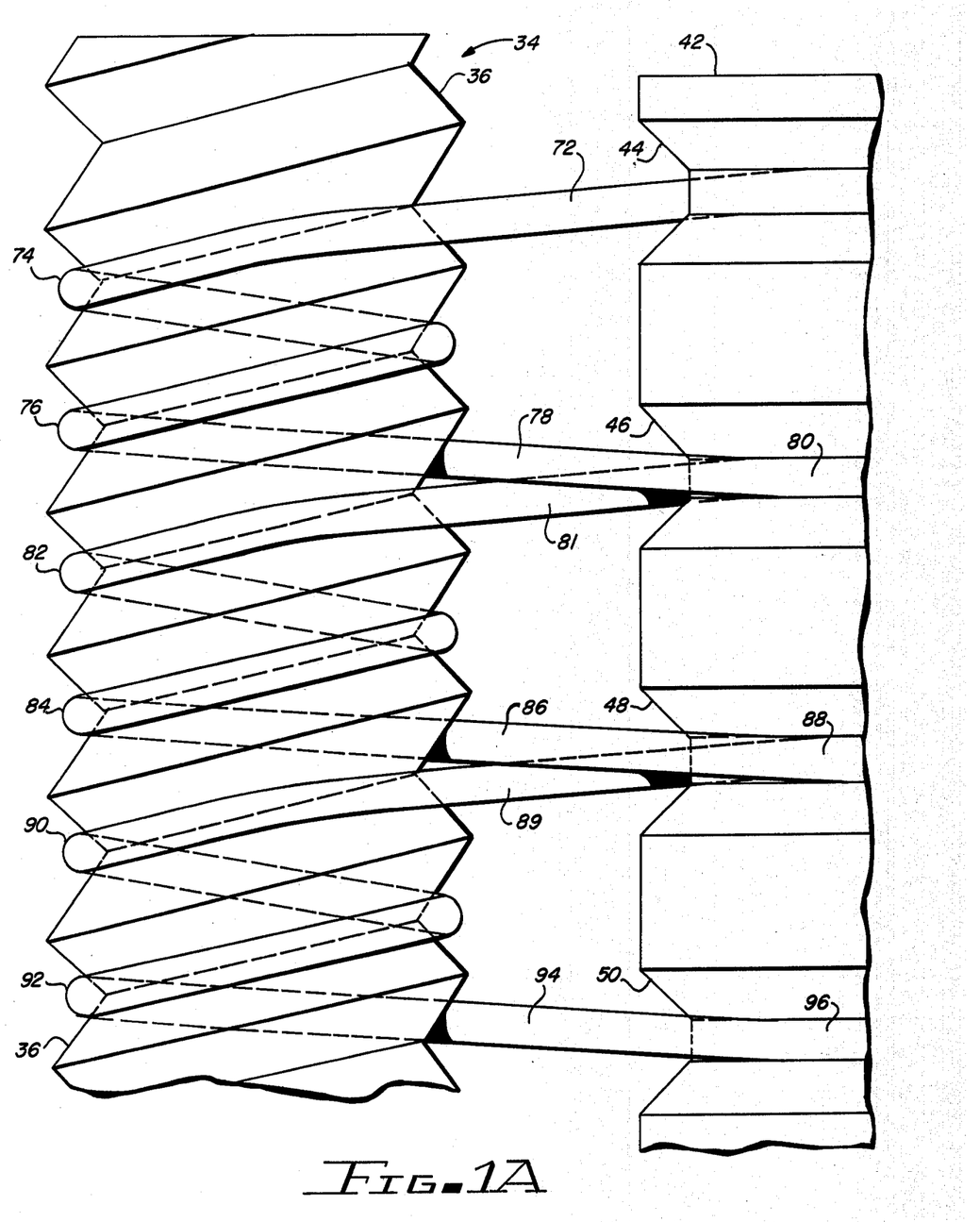
FIG. 1A is an enlarged view of a portion of the apparatus of FIG. 1.

The driven element 42 comprises a pulley or drum which is appropriately secured to the shaft 40 for joint rotation with the screw 34. The driven element or pulley 42 includes a plurality of parallel grooves on its outer cylindrical periphery. Five grooves are shown in FIG. 1, namely grooves 44, 46, 48, 50, and 52. The spacing apart of the parallel grooves 44 . . . 52 is coordinated with the pitch of the threads 36 on the lead screw 34. For driving purposes, the pitch of the threads 36 may be one-half the actual distance or spacing between each of the parallel grooves 44 . . . 52. That is, there are two threads in same axial distance between adjacent grooves, as shown in FIG. 1A, which is an enlarged view of a portion of the apparatus 10 of FIG. 1, and in FIG. 10. An alternative pitch is three threads between a pair of grooves, as is illustrated in FIGS. 4, 7, 8, and 9.

The relative diameters of the driving element 34 and the driven element 42 are appropriately selected to provide the desired movement of the driven element to position it, and any apparatus secured to it, as desired. The motor 30 is preferably a reversible electric motor capable of driving the element 34 in two directions, as desired. As will be understood, the greater the ratio of the diameters of the driven and the driving elements, the greater the degree of precision for controlling the movement of the driven member.

Figures 5, 6, 7, 12:
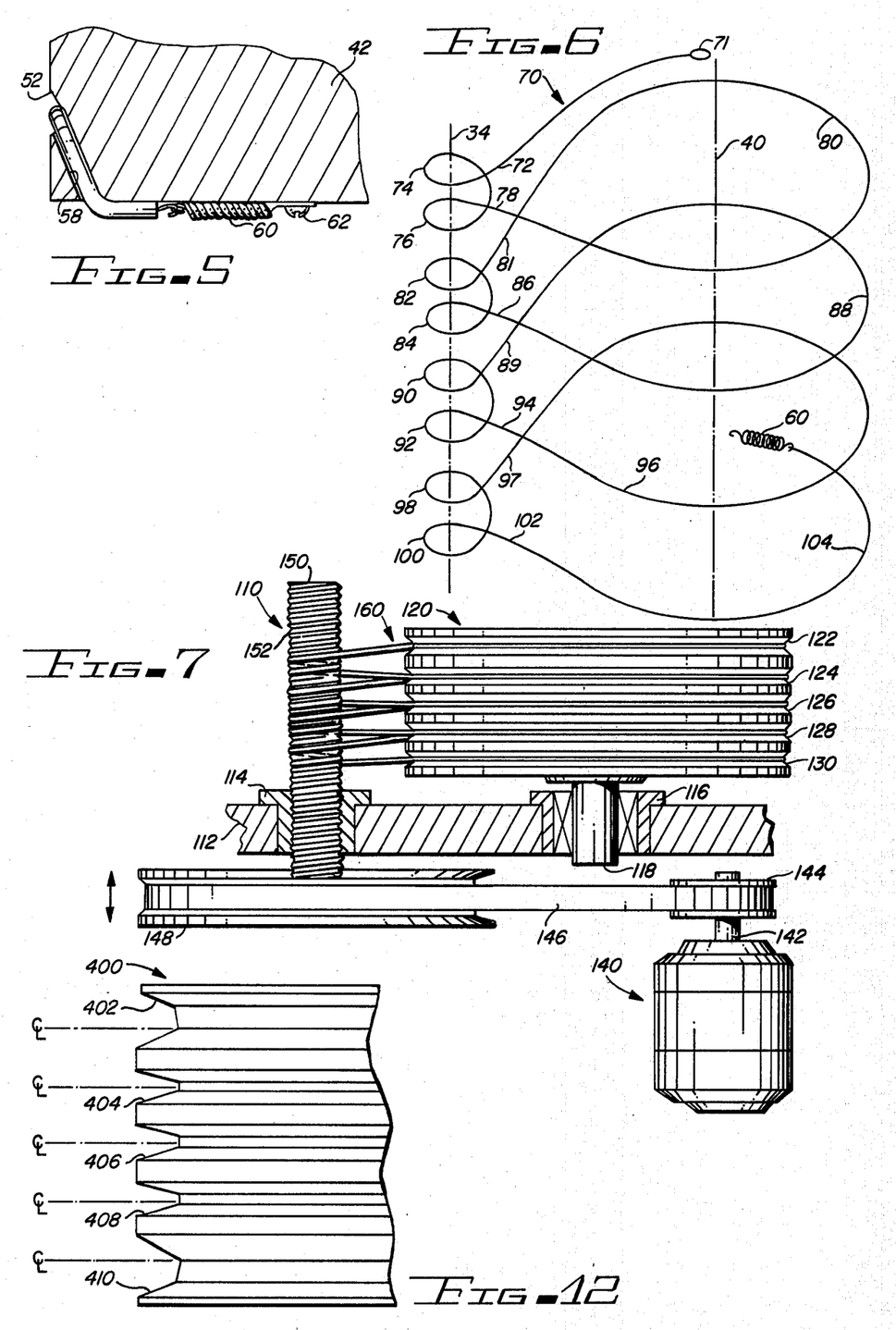
FIG. 5 is an enlarged view in partial section of a portion of the apparatus of the present invention.
FIG. 6 is a schematic representation of a portion of the apparatus of the present invention.
FIG. 7 is a side view in partial section of an alternate embodiment of the apparatus of the present invention.
FIG. 12 is a side view of a portion of an alternate embodiment of a driven member usable with the apparatus of the present invention.

FIG. 2 is a top view of the positioning apparatus 10 of FIG. 1. FIG. 3A is an enlarged view of a portion of the driven element 42, taken generally from circle 3A of FIG. 2. FIG. 3B is an enlarged view in partial section of the element 42 taken generally along line 3B—3B of FIG. 3A. FIG. 4 is a side view of positioning apparatus 10 of FIG. 1, illustrating the connection between the driving element 34 and the driven element 42 by a cable 70. FIG. 5 is an enlarged view in partial section of a portion of the positioning apparatus 10. FIG. 6 is a schematic diagram illustrating the winding of the cable 70. For the following discussion of the positioning apparatus 10, reference will be made to FIGS. 1, 1A, 2, 3A, 3B, 4, 5, and 6.

The cable 70 is used to connect the driving element 34 and the driven element 42. The cable 70 is appropriately secured to the top of the driven element 42 by a screw 56, as shown in FIGS. 2, 3A, and 3B. The screw 56 secures one end of the cable 70 through an eyelet 71, or the like, appropriately secured to one end of the cable 70.

From the screw 56 on the top of the driven element or pulley 42, the cable 70 extends through a slot 54 which communicates with the uppermost groove 44 from the outer periphery of the driven element 42. The driven element 42, which may be referred to as a pulley or a drum, may be of any appropriate diameter.

As best shown in FIGS. 2 and 4, the cable 70 extends from the screw 56 to the groove 44, and in or along the groove 44 around the driven element 42 to a location opposite the lead screw 34. The cable 70 then extends to the lead screw 34 and follows the threads 36 around the lead screw for nearly two complete threads. From the second thread, the cable then extends to the second groove 46. The cable 70 then follows the groove 46, and remains therein, for nearly 360°. After extending around the driven element 42 in the groove 46, the cable extends back to the lead screw 34, and into substantially the same thread as it departed from to go to the groove 46, as shown in FIG. 1A. This is using the two-to-one ratio. If a three-to-one ratio is used, then the thread is vacant and the cable goes on the next (fourth) thread, as shown in FIG. 4.

After two more turns in the threads of the lead screw 34, the cable 70 again extends to the driven element, and this time into the next lowest groove 48, which is located immediately beneath the groove 46. The cable 70 continues around the driven element 42 in the groove 48 for nearly 360°, or substantially parallel to the portion of the cable 70 in the grooves 46 and 44. The cable then extends again back to the lead screw 34 and makes two more turns in the threads about the lead screw 34. The cable then extends once again to the driven element 42, and this time into the next lower slot 50. After following the slot 50, the cable extends back to the screw 34, into the thread adjacent to where it departed, and the cable follows two more threads around the screw before extending back to the drum or pulley 42 and into the lowest groove 52. The cable 70 follows the groove 52 and its lower end is finally secured to the drum or pulley 42.

For terminating the cable 70, as best shown in FIGS. 4 and 5, the cable 70 extends from the groove 52 through a slot 58 onto the bottom of the driven element 42. The bottom or lower end of the cable 70 is connected to a tension spring 60. The spring 60 is appropriately secured to the bottom of the driven element 42 by a screw 62. The tension spring 60 assures that there will be no slack in the cable 70 between the screw 56 at the upper end of the cable and the screw 62 at the lower end of the cable. It will be understood, as is well known, that the tension of the cable 70 and the spring 60 will be transmitted relatively evenly, or equalized, throughout the length of the cable 70, by and during usage of the positioning apparatus 10, as during a "break-in" period.

As shown best in FIG. 1A, the portions of the cable 70 extend from the grooves in the drum or driven element 42 substantially parallel to each other and they extend onto the screw or driving element 34 substantially parallel to each other. This is accomplished by virtue of the pitch of the threads 36 on the lead screw or driving element 34. Each screw thread has a pitch which is equal to one-half of the distance or spacing between the adjacent parallel grooves 44 . . . 52. The threads 36 thus require two complete turns, or 720°, to extend vertically and axially the distance between adjacent grooves on the drum 42.

It may not be technically correct to compare the pitch of the threads 36 of the lead screw 34 to spacing of the grooves 44 . . . 52 since the grooves are not threads, but rather they are each continuous grooves which extend for a full 360° about the outer periphery of the cylindrical driven element 42. However, a comparison of the axial distance between each of the adjacent grooves 44 . . . 52 and the pitch of the threads 26 of the lead screw 34 serves to explain why, as best seen in FIG. 1A, the threads 26 of the lead screw 34 are completely used or occupied between the uppermost groove 44 and the lowermost groove 52 (not shown).

The pitch of the threads 36 of the driven element 34 is one-half the axial distance between the parallel and adjacent, equally spaced grooves of the driven element 42. If, for example, the linear or axial distance from the grooves 44 to the groove 52 is one inch, there are five grooves per inch. The number of the threads 36 of the screw 34 will be two times five, or ten, threads per inch. When the cable 70 comes off the top groove 44, it extends directly or "straight and level" to the screw 34 and to the portion of the thread 36 directly opposite the groove 44. The cable then extends around or in the screw threads 36 for two complete turns, or seven hundred twenty degrees, and then back to the driven element 42 and directly into the groove 46. After following the groove 46 circumferentially about the driven element 42, the cable again extends directly to the screw 34 and onto the same screw thread it left. The cable then follows the threads, again downwardly, for two or more turns. It then extends back to the drum or driven element and into the groove 48. This process continues until all the threads 36 on the screw 34 are occupied from the top groove 44 to the bottom groove 52.

With a pitch of a single thread equal to one-half the distance between grooves, each thread is filled between the top groove 44 and the bottom groove 52. The cable portions between the screw 34 and the driven element or drum 42 are parallel to each other. The cable 70 exits a thread and returns to the same thread since it remains in a single groove on the driven element 42 for substantially three-hundred-sixty degrees. Both two-to-one and three-to-one pitch ratios also provide that rotation of the driving element 34 by the motor 30 will result in the cable 70 maintaining its relative spacing with respect to the grooves on the driven element 42 even though, or while, the driven element 34 moves up or down, depending on the direction of rotation of the motor 30. The cable portions maintain their relative orientation regardless of movement of the screw 34. The movement of the cable 70, the screw 34, and the drum 42 will be discussed in detail below, in conjunction with FIG. 6.

In FIG. 4, a three-to-one thread ratio is illustrated. The descriptive material set forth above for FIG. 1A is also applicable to FIG. 4 in that the cable maintains its relative position as the screw and drum rotate. A single thread is vacant between two occupied or filled threads, for a total of three threads between grooves. The angles of the cable portions between the drum and the screw are different for the two different ratios, and the crossing angle of the cables going to and coming from a drum groove is greater for the 3:1 ratio than for the 2:1 ratio.

For positioning an element (not shown) secured to the drum 42 on the shaft 40, the motor 30 is actuated. Movement of the motor 30 results in an appropriate rotary movement of its armature shaft (motor shaft) 32. Rotary movement of the shaft 32 in turn results in a corresponding movement of the lead screw 34, which is appropriately secured to the shaft 32. The ratio between the diameters of the driving element 34 and the driven element 42 determines the relative rotational movement of the respective elements. The ratio of the diameters, as is well known and understood, may be selected to provide the desired control of the driven element 42 with respect to the driving element 34. For example, a ratio of ten-to-one between the diameters of the driven element 42 with respect to the driving element 34 results in requiring ten revolutions of the driving element 34 to one revolution of the driven element 42. It will be understood that substantially precise positioning of the driven element 42 may be accomplished by the motor 30 acting through the driving element 34.

The flexure 22 moves vertically with respect to the base 12 to compensate for vertical movement of the motor 30 and of the lead screw 34, while at the same time preventing the motor 30 from rotating. If relatively long vertical movements of the motor 30 are anticipated, the flexure may move vertically on appropriate bearings on the support shaft 20. If relatively small vertical movements of the motor 30 are anticipated, vertical movement of the flexure 22 may be accomplished without necessitating a vertical movement of the entire flexure with respect to the support 20, but may be accomplished by only the vertical movement of the flexure 22 at the motor 30, or between the motor 30 and the support 20.

FIG. 6 is a schematic representation of the winding or looping of the cable 70 with respect to both the driving element 34 and the driven element 42. For convenience of illustration, only a pair of center lines, representing the axes of rotation of the driving element 34 and of the driven element 42 through its shaft 40, are illustrated in FIG. 6. The center lines are respectively indicated by reference numerals 34 and 40 of the driven element 42, respectively.

The cable 70 is shown in FIG. 6 as extending from the top of the driven element to the driving element. Various portions of the cable 70 are identified by reference numerals to assist in the understanding of the explanation of the cable winding. The reference numerals used in FIG. 6 are the same as used in FIGS. 1A and 4. Accordingly, for the following discussion, reference will be made to FIGS. 1A, 4, and 6 for an understanding of the winding of the cable 70 about the driving member 34 and the driven member 42. It will be noted that the term "loop" (or "loops") is used to refer to both the circumferential extent of portions of the cable 70 in grooves on the drum 42 and the extent of the cable 70 in the helical threads on the screw 34, and that an angular extent of about three hundred sixty degrees per loop is meant. The term "intermediate" is used to refer to the portions of the cable 70 between the "loops", or between the screw and the drum.

From the eyelet 71, the cable 70 extends in grooves 44 towards the driving element 34. A first portion 72 of the cable 70 is shown extending between the driven element 42 and the driving element 34 and the cable then follows two threads downwardly. The first loop of the cable 70 which extends around the driving element 34 is identified by reference numeral 74, and the second loop is identified by reference numeral 76. When the loop 76 completes its travel about the driving element 34, it becomes an intermediate portion 78 between the driving element 34 and the driven element 42. The portion 78 then connects to a relatively large loop portion 80 of the cable 70 in the groove 46.

The loop portion 80 defines a loop of substantially 360°, and it then extends back to the driving element 34. The loop 80 around the driven element 42 then extends to a return intermediate portion 81, which in turn extends to a loop 82 on the driving element 34. It will be noted that the return intermediate portion 81 may go to the driving element 34 at substantially the same thread which the intermediate portion 78 departed from. Accordingly, the first portion of the loop 82 is substantially adjacent to the loop 76 and to the intermediate portion 78 with respect to the thread 36 on the driving element 34, as in FIG. 1A. In the alternative, there may be a vertical space between loop 76 and loop 82, as in FIG. 4.

Below the loop 82 is a second loop 84. The loop 84 then extends to an intermediate portion 86 between the driving element 34 and the driven element 42, and the portion 86 extends to a loop 88 disposed in the groove 48 in the driven element 42.

After extending substantially circumferentially in the groove 48, the loop 88 extends to a return intermediate portion 89 which passes the intermediate portion 86. The return portion 89 may extend back to the screw thread that the loop 84 and the intermediate portion departed from (FIG. 1A) or it may skip a thread (FIG. 4) and the cable 70 then becomes another loop 90 on the driving element 34. The loop 90 extends directly to a second loop 92, below the loop 90. Loop 92 extends to an intermediate portion 94 between the driving element 34 and the driven element 42. The portion 94 extends to another large loop 96 in the groove 50. From the groove 50, the loop 96 extends to a return intermediate portion 97, which extends back to the driving element 34. A pair of loops 98 and 100 follow the loop 96. The loops 98 and 100 extend consecutively down the threads 36 on the screw 34. When the loop 100 completes its 360° helical loop in the threads 36 of the driving element 34, it connects to an intermediate portion 102 which in turn extends to a final large loop portion 104 in the lowermost groove 52 on the driven element 42. The loop 104 terminates at the spring 60 to which it is appropriately secured. The spring 60 is in turn secured to the bottom of the driven element 42, all as discussed above.

From the above description, it will be noted that, as best shown in FIG. 1A, the cable 70 may cover substantially all of the threads, or extend through or along all of the threads on the driving element 34 from a height on the driving element corresponding to the height of the uppermost groove 44 and terminating at the height of the lowermost groove 52. Since the cable comes off each thread and extends directly to a groove and follows that groove, when the cable extends back to the threaded element it enters the threaded element at about the same height that it left, returning again to the same thread. Since the grooves are parallel to each other, it follows that the cable portions 72, 78, 86, 94, and 102 are all substantially parallel to each other, and their corresponding intermediate return portions 81, 89, and 97 at the end of each loop that return to the threaded member 34 are generally parallel to each other. The general parallel relationship lasts until the return portions intercept the thread from where the portions 78 . . . 102 departed. The loop portions on the threaded element 34 then follow the threads helically downwardly.

The above discussion with respect to the cable 70 between the driving member or element 34 and the driven member or element 42, and the loops about both members, applies substantially the same for an alternate embodiment 110 illustrated in FIG. 7. The primary difference between the embodiment 110 of FIG. 7 and the embodiment 10 of FIGS. 1-5 is in the motor system. FIG. 7 comprises an alternate embodiment 110 of the apparatus 10 of FIGS. 1-5, utilizing substantially the same driving element, driven element, and cable arrangement. For convenience, the illustration of the securing of the cable ends to the driven element has been omitted from FIG. 7.

The alternate embodiment 110 includes a base 112 to which is secured a tapped nut 114. Also secured to the base 112, and spaced apart from the tapped nut 114, is an appropriate bearing assembly 116. A shaft 118 is journaled for rotation in the bearing assembly 116. The shaft 118 is secured to a drum or pulley 120, which comprises the driven element for the apparatus 110.

The driven element 120 is substantially identical to the driven element 42 of the apparatus of FIGS. 1-5. The driven element 120 is a cylindrical drum or pulley secured to the shaft 118 on its longitudinal axis for rotation. The outer periphery of the driven element 120 includes five spaced apart and parallel, circumferentially extending grooves 122, 124, 126, 128, and 130.

Also secured to the base 112 by appropriate means (not shown) is a reversible electric motor 140. The motor 140 includes an output shaft 142. A pulley 144 is secured to the shaft 142. Spaced apart from the motor 140, and aligned with its pulley 144, is a pulley 148. The diameter of the pulley 148 is substantially greater than that of pulley 144, as will be discussed in detail below. The pulley 148 is in turn secured to a shaft 150 which includes a plurality of external threads 152. The threaded shaft 150 extends through the tapped nut 114 and the shaft 150 moves vertically with respect to the base 112 and to the nut 114 in response to rotation of the pulley 148. The pulley 148 is driven by a belt 146. The belt 146 extends between the pulleys 144 and 148.

A cable 160 is appropriately secured at its opposite ends to the top and bottom of the driven member or element 120. Between the driven element 120, the cable extends to and wraps around the consecutive threads 152 of the driving element or screw 150. The cable 160 extends about the grooves 122 . . . 130 and around the threads 152 of the screw 150 in substantially the same manner as discussed above in conjunction with the embodiment of FIGS. 1-4, and as described with respect to FIGS. 1A, 4, and 6.

In the embodiment of FIG. 7, the belt 146 takes up the axial travel of the screw 150 as the pulley 148 rotates. The diameters of the pulleys 144 and 148 determine the relative rotation of the pulleys 144 and 148. In turn, the diameters of the screw 150 and the drum 120 determine the relative rotational movement of those members with respect to the positioning of the driven element 120, and of any apparatus secured thereon, by the driving element 150. When considering the ratio of the diameters of the pulleys 144 and 148, and of the screw 150 and the driven member 120, the degree of precision to which the positioning of the driven element 120 may be accomplished may be understood and appreciated.

The driven element 120 includes five grooves, as does the driven element 42 of FIGS. 1-5. The pitch of the threads 152 on the screw 150 may equal one-half or one-third the pitch or distance between the parallel grooves on the driven element 120, just as discussed above in conjunction with the screw 34, its thread 36, and the driven element 42. Between the driven element 120 and the screw 150, the appropriate portions of the cable are, of course, substantially parallel to each other. And, as discussed above, the winding of the cable 160 with respect to both the driving elements 150 and the driven element 120 is substantially as described above, and as is schematically illustrated in FIG. 6.

Figures 8, 9, 13, 14:
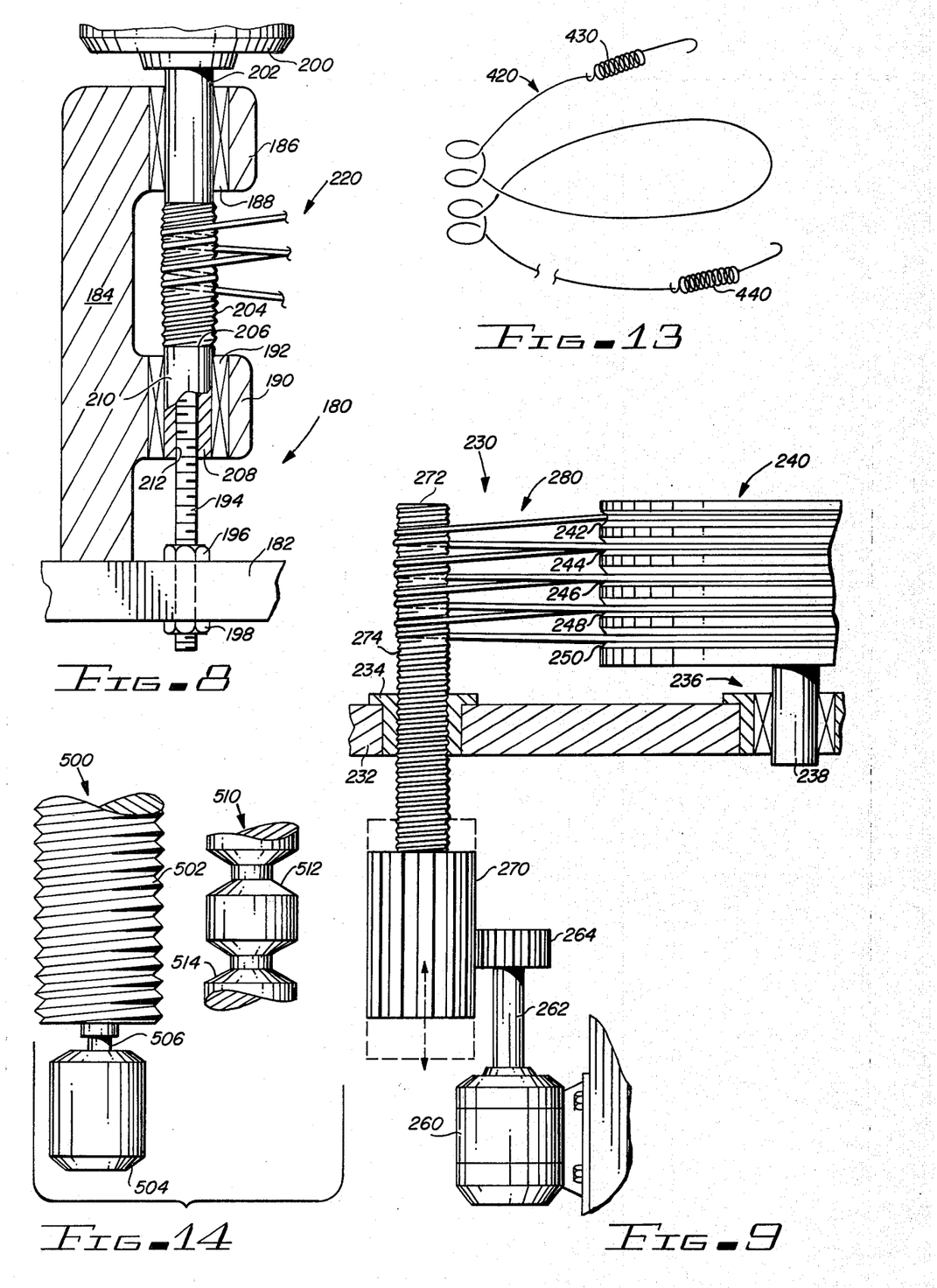
FIG. 8 is a side view in partial section of another alternate embodiment of the apparatus of the present invention.
FIG. 9 is a side view in partial section of another alternate embodiment of the apparatus of the present invention.
FIG. 13 is a schematic representation of an alternate embodiment of a cable usable with the apparatus of the present invention.
FIG. 14 is a schematic representation of an alternate embodiment of the apparatus of the present invention.

FIG. 8 comprises a view in partial section of an alternate embodiment of the apparatus of the present invention. Rotation, and accompanying axially vertical movement, of a threaded driving member is used in conjunction with a cable wrapped around, and extending between, the threaded driving member and a parallel grooved driven member (not shown). This feature is still the primary concept of the apparatus of FIG. 8, as it was with the apparatus 10 and the apparatus 110 of FIGS. 1-7, as discussed above. A motor is connected directly to the threaded member in the embodiment of FIG. 8 for direct drive.

Positioning apparatus 180 in FIG. 8 includes a base 182 to which is secured a vertically extending structural member 184. The vertically extending member 184 comprises a structural frame member used to support substantially the entire weight of the driving portion of the apparatus 180.

The vertical frame member 184 includes an upper arm 186 and a lower arm 190 which are substantially parallel to each other. The arms 186 and 190 extend outwardly substantially perpendicularly to the member 184. The lower arm 190 is spaced apart, vertically, above the base 182.

Both arms 186 and 190 include apertures extending through them that are axially aligned with each other. Appropriate linear bearings 188 and 192 are secured within the apertures in the arms 186 and 190, respectively. Portions of a threaded driving member or screw 204 extend through the bearings 188 and 192. The linear bearings 188 and 192 carry the cable extension load without excessive friction on threads 206 of the threaded element 204.

A motor 200 is shown disposed above the base 182 and the vertical frame member 184, and appropriately aligned with the linear bearings 188 and 192. The motor 200 includes an output shaft 202 which is directly, and axially, secured to the threaded member 204. It is understood that the motor is fixed relative to the base 182 and the arms 186 and 190 so that its output shaft rotates while the motor moves vertically. The portion of the output shaft 202 which extends to the linear bearing 188, above the threaded member or shaft 204, defines the bearing surface for the motor and is appropriately polished, hardened, or the like. The shaft 202 moves vertically through the bearing 188, in response to actuation of the motor 200, as will be discussed below. The lower portion of the threaded member 204, remote from the output shaft 202, is connected to a sleeve or bearing portion 210, which extends through the linear bearing 208. The sleeve 210 includes an internally threaded bore 212 which receives the threaded exterior of a rod or stud 194. The pitch of the threads on the rod 194 is substantially the same as the pitch of the threads 206 on the member 204. The rod 194 is appropriately secured to the base 182, as by a pair of nuts 196 and 198.

If desired, the output shaft 202 of the motor 200 may be secured to a sleeve which extends to the linear bearings 188, and similarly, the sleeve 210 may actually be a portion of the member 204, as desired. Whether the bearing portions which move within the linear bearings 188 and 192 in response to rotation of the motor are integral or are separate elements is a matter of choice. In any event, rotation of the output shaft 202 of the reversible motor 200 causes rotation of the threaded member 204. With the threaded rod or stud 194 fixed to the base 182, rotation of the threaded member 204 results in vertical movement of the member 204 with respect to the linear bearings 188 and 192.

A cable 220 is disposed about a drum or driven member (not shown) substantially as described above with respect to the drums or driven members 42 and 120. Rotation of the motor 200 results in rotation of the driving member 204, which is in turn translated into movement of the driven member by movement of the cable 220 with respect to the threads 206 and to a plurality of parallel grooves on the outer periphery of the driven member. For convenience, only a portion of the cable 220 is illustrated in FIG. 8. It will be understood that the cable 220 may include as many loops as desired about the driven member, and that the pitch of the threads on the threaded member 206, the driving member, may be any ratio desired with respect to the spacing of the grooves on the driven member. Thus, rather than employing a pitch ratio of two-to-one, as discussed above in conjunction with FIGS. 1-7, and also as illustrated in FIG. 1A, a three-to-one or some other ratio may be used. A one-to-one ratio may also be employed, if desired. However, a ratio of at least two-to-one appears to be preferable with respect to the smooth functioning of the apparatus, overall. A three-to-one ratio is illustrated in FIG. 8.

FIG. 9 is a view in partial section of another alternate embodiment of the apparatus of the present invention. It comprises a view in partial section of positioning apparatus 230 in which a gear drive is employed for rotating the driving member.

The apparatus 230 includes a base 232 to which is secured a tapped nut 234. A bearing assembly 236 is also secured to the base 232. A shaft 238 is appropriately secured to and journaled for rotation in the bearing assembly 236. A driven element 240 is secured for rotation to the shaft 238. The driven element 240 is substantially identical to the driven elements discussed above in conjunction with the other embodiments. It comprises a generally cylindrical drum having five parallel grooves 242, 244, 246, 248, and 250 extending circumferentially about the cylindrical periphery of the drum. The shaft 238 extends through the axis of rotation, which is the cylindrical axis of the element 240.

A reversible electric motor 260 is appropriately secured to a portion of the base 232. The motor 260 includes an output shaft 262. A spur gear 264 is in turn secured to the shaft 262 remote from the motor 260. The gear 264 is a spur gear which is preferably made of hardened steel, or the like. The gear 264 meshes with another spur gear 270, which is an elongated gear preferably made of relatively soft or pliable material. The gear 270 is secured to a threaded shaft 272 which extends through the tapped nut 234. The shaft 272 includes a plurality of threads 274. A cable 280 extends from the driven element 240 to the threaded shaft 272, and along the helical threads 274 of the shaft 272. The cable 280 also extends from the driving element 272 to the driven element 240, and around the driven element in the respective grooves, all substantially as discussed above in conjunction with the other embodiments. The fastening of the cable 280 to the driven element 240 is not shown. It will be understood that the operation of the drum or driven element 240, with respect to its grooves 242 ... 250, the cable 280, and the threads 274 and shaft 272 are all as discussed in detail above.

Rotation in either direction of the shaft 262 of the motor 260 results in corresponding movement of the gear 264 secured to the shaft 262. The meshing of the gears 264 and 270 results in rotary and vertical movement of the gear 270. Since the gear 270 is secured to the threaded shaft 274, which extends through the fixed, tapped nut 234, rotary movement of the gear 270 and the shaft 274 results in a combination of vertical movement and rotary movement of the gear 270 and the shaft 274. The gear 270 is elongated to accommodate the vertical movement. The vertical movement of the gear 270 is indicated in dotted line in FIG. 9.

The positioning of the driven element 240 by the cable 280 in response to rotation of the shaft 272 is substantially as discussed in detail above. However, it may be noted that the gears 264 and 270 are preferably preloaded to eliminate backlash. Using a tension spring in conjunction with the cable 280, as discussed above, eliminates slack in the cable. With a preload on the gearing, movement of the motor shaft 262 results in direct, appropriate movement of the driven element 240.

As with the other embodiments, the selection of an appropriate ratio between the diameters of the driving element 272 and the driven element 240, coupled together with an appropriate ratio between the diameters of the gears 264 and 270, results in the desired control and positioning of the driven element 240 in response to movement in either direction of the motor 260.

Figure 10:
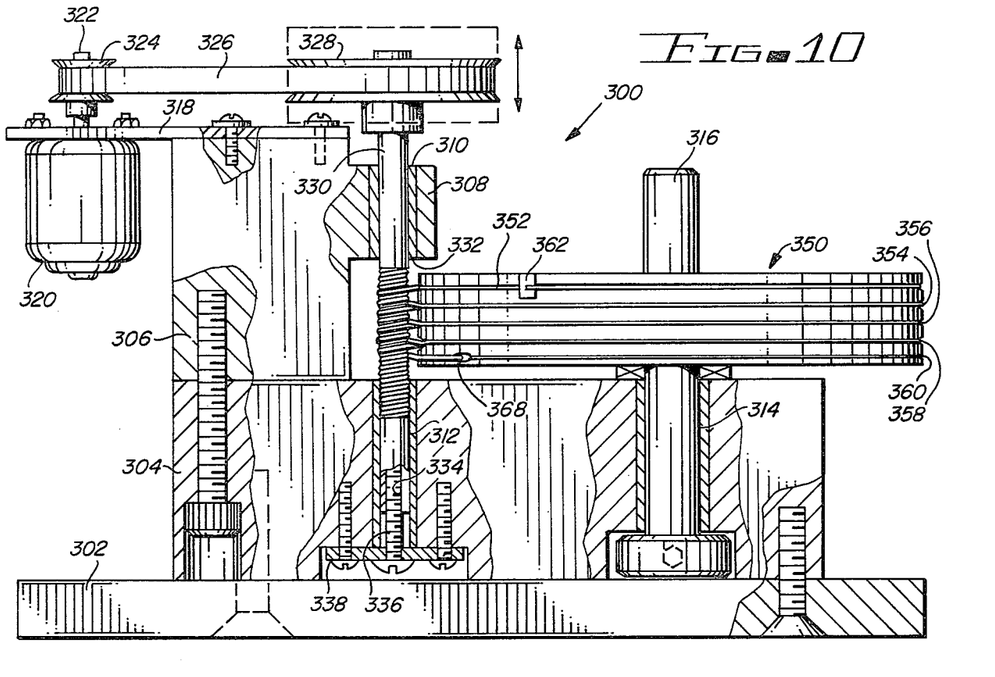
FIG. 10 is a side view in partial section of another alternate embodiment of the apparatus of the present invention.
Figure 11:
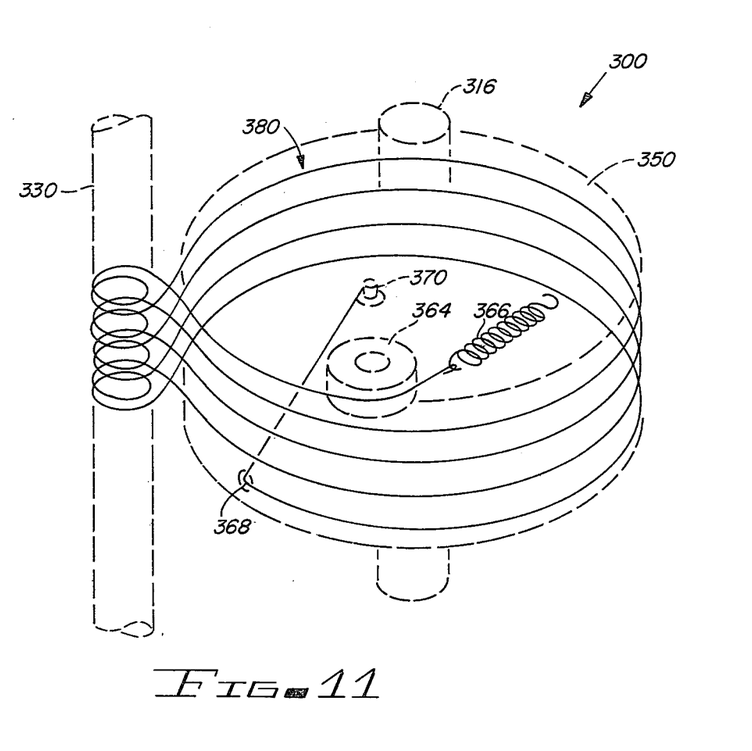
FIG. 11 is a schematic representation of a portion of the apparatus of FIG. 10.

FIG. 10 is a view in partial section of apparatus 300, which comprises an alternate embodiment of the apparatus of the present invention, with portions broken away to illustrate various facets of the apparatus, such as fasteners and bearings, etc. Right-handed threads are used for the apparatus 300. FIG. 11 is a schematic representation of the positioning apparatus 300 of FIG. 10, illustrating the cable system employed with the apparatus 300, but using left-handed threads. FIGS. 10 and 11 accordingly are "mirror images" of each other. For the following discussion, reference will be made to FIGS. 10 and 11 concerning the positioning apparatus 300.

The positioning apparatus 300 includes a base 302, which is illustrated as being a generally rectangularly configured plate. Disposed on the base plate 302, and appropriately secured thereto, as by a plurality of screws, is a block 304. The block 304 extends upwardly from the top surface of the base plate 302 and is used to support an upper base or block 306 at one end of the block 304. The drum or driven member 350 is spaced apart from the upper base or block 306. The upper base or block is appropriately secured to the block 304, as by a plurality of screws, as shown in FIG. 10.

The block 306 includes an arm 308 which extends outwardly from the block 306, and substantially parallel to the top surface of the block 304. A bore extends through the arm 308, and an appropriate bearing, such as an "oilite" bearing 310 is disposed in the bore. The bearing 310 is appropriately aligned with another bore which extends through the block 304 and in which is disposed another "oilite" bearing 312. Centrally disposed within the bearing 312, at the lower part of the bore, is a guide screw 336. The screw 336 is appropriately secured through a plate 338 to the block 304. A drive screw 330 extends through the bearing 310 in the arm 308, and downwardly into the bearing 312 in the lower block 304. The screw 330 includes a plurality of external threads 332 over its center section between the bearings 310 and 312. At the lower portion of the screw 330 is an internal bore 334. The bore 334 is internally threaded to receive the screw 336. The screw 336 is externally threaded and the bore 334 is appropriately internally threaded with matching threads for driving the screw 330 axially through the block 304 and through the bearings 310 and 312 as the drive screen 330 rotates.

Secured to the upper surface of the block 306 is a motor support 318. A reversible electric motor 320 is appropriately secured to the support 318. The motor 320 includes an output shaft 322 to which is secured a pulley 324. A belt 326 is secured between the pulley 324 and a pulley 328 which is in turn disposed on, and secured to, the upper portion of the drive screw 330.

Spaced apart from the bore in the lower block 304 in which the bearing 312 is disposed, and substantially parallel thereto, is another bore in which is disposed a bushing 314. The bushing 314 receives a rotatable shaft 316. A drum or pulley 350 is secured for rotation to the shaft 316. As is well known and understood, the drum 350 and its shaft 316 are appropriately supported and journaled for rotation with minimum frictional problems.

The drum 350, which comprises the driven element of the apparatus 300, is substantially identical in overall appearance to the drums or driven elements of the embodiments discussed above. It is a generally cylindrical element having a plurality of parallel and spaced apart grooves extending circumferentially about the drum. The grooves include a top groove 352, and grooves 354, 356, 358, and 360, which are spaced apart equal distances from each other and downwardly from the upper groove 352.

The drum 350 includes an upper slot or bore 362 which communicates with the groove 352 and which extends inwardly with respect to the drum 350. Within the slot or bore 362 is a roller 364 which is appropriately journaled for rotation. The roller 364 is disposed adjacent to the groove 352. A cable 380 (see FIG. 11) is secured at one end of the cable to a tension spring 366, which is also disposed within the drum 350. The roller 364 reduces or minimizes the friction of the cable 380 as it curves outwardly from the drum and the slot 362 to the groove 352.

The drum 350 also includes a lower slot 368 which extends inwardly with respect to the drum. The slot 368 communicates with the groove 360. Within the slot 368 in the drum 380 is a pin 370. See FIG. 11. The lower end of the cable 380, remote from its upper end, and from the spring 366 secured thereto, is appropriately secured to the pin 370. The cable 380, extending between the pin 380 and the tension spring 366, has a substantially constant amount of tension throughout its entire length, as discussed above, in conjunction with the other embodiments of the present invention. The winding of the cable 380 about the drum 300 and the screw 330 is schematically illustrated in FIG. 11.

The pitch of the threads 332 on the drive or lead screw 330 is one-half the distance between each of the grooves on the outer periphery of the drum 350. Accordingly, between each of the grooves 352 ... 360, the cable 380 extends about the screw 330 for substantially two complete turns, or two helical turns. The cable 380 accordingly is substantially parallel to itself each time it extends between the screw 330 and the drum 350.

In the embodiments of the present invention, the pitch of the lead screw or drive screw is discussed as being one-half or one-third the spacing between adjacent grooves on the driven element or drum. The reason for a pitch ratio of two- or three-to-one is to provide sufficient frictional drive to allow the drum or driven element to respond to immediate changes in direction and rotational velocity of the drive screw. As may be understood, the pitch of the threads on the drive screws may be in a one-to-one ratio with the spacing between the grooves on the driven element, if desired. For many applications, a one-to-one ratio, or one complete revolution (helical) of a cable around a lead screw and between adjacent grooves on a driven element, may provide sufficient friction. However, other applications, for example in high speed tracking systems, with substantial acceleration and directional changes required, a pitch ratio of two-to-one, as discussed herein, or even a greater pitch ratio then two-to-one may be desired.

In the several embodiments discussed herein, various types of connections between the electric motor and the driving element have been discussed. In the embodiment of FIG. 10, as in the embodiment of FIG. 7, a belt drive between a pair of pulleys is employed. The belt takes up the axial travel of the driving element, and accordingly offers advantages in that regard. Moreover, the advantage of selecting a desirable ratio between the diameters of the two pulleys involved in a belt drive also offers advantages for selecting drive motors which provide an advantage over direct drive motors for certain applications, with respect to speed and torque capabilities. However, for certain applications, the employment of a direct drive system, such as employed in the embodiment of FIG. 9, offers advantages.

It will be again noted, as discussed above, that in all of the embodiments discussed herein, the cable leaves and enters each groove of the driven element at substantially the same height. The lead screw or drive screw in each embodiment moves vertically, but the cable entering and leaving the threads of the drive screw remains substantially constant with respect to the height of the cable and the grooves on the driven element. The driven element, or drum, in each case employs a plurality of parallel, circumferentially extending grooves.

In the embodiment of FIG. 8, only three portions of the cable 220 are shown extending from the drive or lead screw 204, while in the other embodiments, five cable portions extend between the drive screws and the driven members. The number of grooves on a driven member may vary in accordance with the particular requirements of the application to which the apparatus is put. For some applications, possibly two or three grooves on the driven member may be sufficient, while other applications, such as high speed tracking, or where high velocities and/or acceleration, mass, or the like, must be taken into consideration, five, ten, or twenty grooves, or more, may be required. However many grooves are used, both ends of the cable are secured to the drum or driven member, and intermediate portions of the cable extend along the threads of the driving member, which is in turn connected to a reversible electric motor. The electric motor may be actuated by any appropriate signal, as desired. Since the control of the electric motor is not an element of the present invention, such control system is not illustrated herein.

FIG. 12 is a side view of a portion of a drum or driven member 400. The drum or driven member 400 has five grooves, as have most of the drums or driven members discussed above. The grooves include a top groove 402, three intermediate grooves 404, 406, and 408, and a bottom or lower groove 410. The center lines of all of the grooves are equally spaced from each other. However, the width of the top groove 402 and the bottom 410 is greater than that of the intermediate grooves 404, 406, and 408. The reason for the increase in the width of the top and bottom grooves 402 and 410, respectively, is to allow extra portions of the cable within the top and bottom grooves.

By proper placement of the cable termination slots in the driven element, the driven element may be rotated substantially more than a full turn of 360 degrees by allowing the ends of the cable to lay doubled in the same groove. With the grooves 402 and 410 wider than needed to accommodate a single cable, and with a sloped bottom in the grooves, the extra cable will lay beside the cable laid down originally during the first revolution. The driven drum may then be rotated substantially more than otherwise may be accomplished.

While it has not been heretofore discussed, it is preferable that the cable diameter be slightly less than the spacing between adjacent thread grooves on the driving member to prevent rubbing and consequent wear. Moreover, since the entire thread groove is occupied by the cable, an overly large cable may ride up out of the thread groove. For this reason, the cable diameter is preferably less than the spacing between the adjacent thread grooves in order to contain the cable within the thread grooves.

In the embodiment of FIGS. 1-9, the cable is fixed or secured directly to the driven member, either by a screw or to a post. The bottom or lower portion of each cable is secured to the driven member or element through a tension spring. In the embodiment of FIGS. 10 and 11 the tension spring is secured to the top of the cable, and the lower end of the cable is terminated to a post. As discussed above, the employment of a tension spring on one end of the cable allows the tension to be uniformly distributed along the cable. The relatively uniform distribution of the tension throughout or along the entire length of the cable prevents backlash and thus allows the driven member and the driving member to move substantially simultaneously. As a practical matter, the choice of whether the tension spring is on one end or the other end of the cable is relatively immaterial. The important thing is that a tension spring be employed for providing uniform tension on the cable at all times, including while the apparatus is at rest as well as while the apparatus is moving.

For some purposes, it may be desirable to have two tension springs employed. That is, two tension springs may be secured to the cable, one at each end. Such embodiment is schematically represented in FIG. 13. FIG. 13 comprises a schematic representation of a cable 420 secured to a pair of tension springs 430 and 440. The end of the cable that would normally be fixed is secured to a high rate spring 430, and the other end of the cable, remote from the high rate spring 430, is secured through a typical tension spring 440, which is similar to the tension springs discussed above in conjunction with the prior embodiments. The spring 440 is softer than the spring 430. The high rate spring 430 will reach equalization with the spring 440 during the normal course of events. The primary function of the high rate spring 430 is to provide the tension relief which may be necessary to the cable 420 in the event that the overall apparatus or system to which the cable 420 and its two springs are secured is overpowered and forced to slip.

In the prior embodiments, with one end of the cable terminated or fixed, in the event of an overpowering of the system the terminated end of the cable collects the combined frictional drag of the entire system and such force or stress could exceed the cable breaking strength. However, the employment of a high rate spring, such as the spring 430, in addition to the normal tension spring 440, allows the cable tension to be relieved by the high rate spring sufficiently to let the cable slip on the driving member or screw without breaking.

While the matter of backlash has been adequately discussed, it may be emphasized that an advantage of the apparatus of the present invention is the substantially complete elimination of backlash between the driven member and the driving member. The cable tension is maintained substantially constant due to the employment of at least a single tension spring at one end of the cable. The cable tension thus is generally quite constant, whether the system is at rest or whether it is moving or operating, to substantially eliminate backlash between the driving and driven elements.

FIG. 14 is a schematic representation of the apparatus of the present invention used in an opposite manner, to increase the speed of the driven member rather than to reduce the speed of the driven member. In the embodiment discussed above, the diameter of the driven member is substantially greater than that of the driving member, thus providing a reduction in rotary speed. However, in the embodiment of FIG. 14, a drive screw 500 is schematically represented adjacent to a driven member 510. The driving member 500 is secured to a reversible electric motor 502 through an output shaft 504. The diameter of the driving member 500 is greater than that of the driven member 510, thus providing for a substantial increase in the rotary speed of the driven member 510 over that of the driving member 500. The same cable arrangement as discussed above in conjunction with the other embodiments may be employed in the embodiment of FIG. 14. That is, a cable (not shown) is secured at both ends to the driven member 510 and extends to the driving member 500, where it extends through several turns following a helical screw thread before extending back to the driven member 510. A pair of grooves 512 and 514 are shown in the driven member 510, while a plurality of screw threads 502 are shown extending helically above the periphery of the drive screw 500. As with the embodiments discussed above, the pitch of the threads 502 of the screw 500 is a function of the axial distance between the grooves on the driven member 510. Obviously, any appropriate diametrical relationship may be established between the driving member and the driven member for either reducing the speed or increasing the speed of the driven element with respect to the driving element.

As the driven drum is rotated, the driving member, or drive screw, moves axially. If the driven element rotates up to two complete turns, obviously the drive screw must move axially twice the distance contemplated with a single rotation of the driven element. However, this axial movement may be accommodated relatively easily by simply extending the length of the driven member, as in the embodiments of FIGS. 1-7, and the distance between bearings, etc., as in the embodiments of FIGS. 8 and 10.

Since the driving member moves vertically upwardly and downwardly, there is a mid-point in its vertical or axial travel, and the movement upwardly and downwardly from that mid-point defines the extent of that vertical travel. It may be easier to refer to the vertical movement as plus or minus a finite amount from a mid position. For example, if the driving member or screw uses thirty-two threads per inch, and a diameter ratio of sixteen-to-one between the driven member and the driving member, the drive screw moves axially sixteen thirty-seconds, or one-half inch. The one-half inch total vertically axial movement of the drive screw may be expressed as plus or minus one-fourth inch from a mid-point. Expressed in such terms, it may be readily understood how the movement of a belt, as for example in the embodiment of FIGS. 7 and 10, may accommodate the total one-half inch movement. If the driven member rotates greater than one complete turn, or greater than 360°, the plus or minus vertical movement of the driving member may still be accommodated with such a belt drive system.

The apparatus of the present invention, as illustrated above, is a relatively low-cost apparatus. The number of parts involved is minimal and the overall system is relatively simple and uncomplicated. Moreover, it will be noted that lubrication is generally not required for the apparatus of the present invention, thus further reducing cost factors.

In the above embodiments, a minimum of three grooves on the driven member, as suggested in FIG. 8, or five grooves, as illustrated in the other embodiments, have been discussed. Three grooves on the driven member may be a satisfactory number of grooves acceptable for some applications. For other applications, more grooves may be desired. As has been discussed, the employment of a particular number of grooves on a driven member, and even the ratio of the pitch of the threads on the driving member, may be selected in accordance with the desired results, or particular application, taking into consideration rotary speed, mass, etc. For illustrative purposes, as fully discussed herein, five grooves have been principally illustrated.

The three grooves suggested by the apparatus of FIG. 8 would include a first groove from which the cable 220 extends to the drive screw, a second groove about which the cable 220 extends for substantially 360°, and a third groove in which the cable is disposed and from which the cable is ultimately terminated to the driven member.

It will be noted, in all of the embodiments discussed herein, that the axes of rotation of the driving member and the driven member are substantially parallel to each other, and of course, the diameters of the driving and driven members extend through the axes of rotation. The driving member and the driven member in each embodiment are spaced apart from each other an appropriate distance, which may vary, as desired, in accordance with the overall sizes of the driven member and the driving member, and in accordance with the size of the apparatus disposed on the driven member and which is to be positioned, etc.

With a fixed ratio between the pitch of the threads on the driving member and the grooves on the driven member, the cable remains parallel to its various portions between the driven and driving members and the parallel relationship is maintained during the movement, vertically, of the driving member. The cable portions are substantially perpendicular to the axes of rotation of the driving and driven members, and the perpendicular relationship continues as the driving member moves vertically upwardly and downwardly due to the correlation in the pitch of the threads of the driving member with respect to the spacing of the grooves of the driven member. In other words, the cable portions remain in a fixed relationship with respect to the driven member as the driving member rotates and moves vertically.

In the embodiments illustrated in FIGS. 1-14, the motors are illustrated and/or discussed as secured to the screws, and the screws comprise the driving members. The drums in each embodiment comprise the driven members. In FIG. 14, the diameter of the screw is greater than the diameter of the drum, thus producing an increase in the speed of the driven member, the drum, over that of the driving member, the screw.

An alternative to the speed increasing embodiment of FIG. 14, rather than to increase the diameter of the screw with respect to the drum, is to connect the motor to the drum element, thus making the drum element the driving member and the screw element the driven member. An increase in speed, in substantially the same ratio as the decrease in speed, results, for example, if the motor 30 were secured to the shaft 40 in the embodiment of FIG. 1, while the element to be positioned or moved (not shown) were secured to the threaded shaft 34. In such a situation, the drum 42 becomes the driving element, and the screw 34 becomes the driven element. The rotary speed of the driven element 34 becomes substantially greater than the rotary or angular speed of the driving element, the drum 42. The same philosophy holds true if in the other embodiments, except for the embodiment of FIG. 14, the motor in each embodiment were connected to the drum shaft to constitute the drum as the driving element, and the screw shaft would then become the driven element.

In the embodiments discussed above, except in the embodiment of FIG. 11, the lead screw, or the driving member, has been illustrated as having right-handed threads. Right-handed threads are more common and accordingly have been so illustrated. However, it is obvious that the apparatus of the present invention will work whether right-handed or left-handed threads are used.

In the embodiment of FIG. 11, left-handed threads are illustrated. The embodiment of FIG. 11 has the cable wound in the reverse direction from that of FIG. 10. As has been discussed, FIGS. 10 and 11 are related, and comprise mirror images of each other with respect to the operation of the driving member, the driven member, and the connecting cable. The only difference between the apparatus of FIG. 10 and that of FIG. 11 is in the direction of the threads on the driving member and the cable between the driving member and the driven member.

The same theory and operation of the apparatus of the present invention applies whether right-handed or left-handed threads are employed on the driving member. The selection of whether to use right-handed threads or left-handed threads on the lead screw, the driving member, is simply a matter of choice. Moreover, whether one uses a two-to-one ratio or a three-to-one ratio, or any other ratio, between the driven member and the driving member, is entirely immaterial with respect to the employment of either right-handed or left-handed threads.

As has been adequately discussed above, the employment of a particular thread, a particular ratio between the diameter of the driven member and the driving member, and the selection of a two-to-one or three-to-one, or any other, ratio, are choices which are generally immaterial as to the theory of the apparatus. For different applications, different choices may be selected, as desired.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Positioning apparatus, comprising, in combination:
    driven means to be positioned, including a drum journaled for rotation and having a plurality of grooves extending circumferentially about the drum;
    drive means for moving the driven means, including
        a screw,
        a plurality of helical threads on the screw, the pitch of which is directly related to the spacing of the grooves on the drum, and
        means for rotating the screw to position the drum; and
    means for coupling the screw to the drum, including a cable having two ends secured to the drum and extending in the grooves of the drum and in the threads of the screw for rotating the drum in response to rotation of the screw.

2. The apparatus of claim 1 in which the means for coupling the screw to the drum includes a first tension spring secured to the drum and to one end of the cable.

3. The apparatus of claim 2 in which the means for coupling the screw to the drum further includes a second tension spring secured to the drum and to the other end of the cable remote from the tension spring.

4. The apparatus of claim 3 in which the second tension spring is a high rate spring having a higher spring rate than the first tension spring.

5. The apparatus of claim 1 in which the plurality of grooves on the drum are substantially parallel to each other and spaced apart equidistant from each adjacent groove.

6. The apparatus of claim 5 in which the pitch of the threads on the screw is correlated to the spacing between grooves on the drum whereby the cable extends directly between the grooves on the drum and the threads on the screw in substantially parallel relationship.

7. The apparatus of claim 1 in which the cable extends from a first groove of the plurality of grooves on the drum to a thread on the screw, follows the thread helically on the screw until the cable is directly opposite a second groove on the drum, extends to a second groove of the plurality of grooves on the drum and is disposed in the second groove on the drum for substantially 360°, and the cable then extends back to the screw and to the thread from where it departed and continues following the thread helically on the screw until the cable is directly opposite a third groove of the plurality of grooves on the drum, and then extends to and is disposed in the third groove on the drum.

8. The apparatus of claim 7 in which the pitch of the threads on the screw is one-half the spacing between grooves on the drum and the cable follows a thread on the screw for substantially two complete turns between each groove on the drum.

9. The apparatus of claim 1 in which the means for rotating the screw comprises a reversible motor connected to the screw.

10. The apparatus of claim 1 in which the drum of the driven means has an axis of rotation and a diameter intersecting its axis of rotation, and the screw of the drive means has an axis of rotation and a diameter intersecting its axis of rotation, and the respective diameters are selected to provide a predetermined ratio for the angular speed of rotation of the drum and the screw.

11. Positioning apparatus, comprising, in combination:
    base means;

screw means, including a screw secured to and journaled for rotation in the base means and movable vertically upwardly and downwardly relative to the base means as the screw rotates;

helically extending threads on the screw having a predetermined pitch;

a cylindrical drum secured to and journaled for rotation on the base means and disposed adjacent to the screw;

a plurality of grooves extending circumferentially about the drum and spaced apart from each other a predetermined distance;

cable means, including a cable secured to the drum and disposed in the grooves of the drum and in the threads of the screw in a predetermined manner whereby the drum is coupled to the screw for rotation of the drum to position the drum as the screw rotates.

12. The apparatus of claim 11 in which the screw means includes a motor coupled to the screw for rotating the screw.

13. The apparatus of claim 11 in which the cable means includes a tension spring secured to the drum and to the cable for providing substantially uniform tension throughout the length of the cable.

14. The apparatus of claim 13 in which the pitch of the helical threads of the screw is one-half the distance between adjacent grooves on the drum.

15. The apparatus of claim 14 in which the cable is disposed in a first groove of the plurality of grooves on the drum and extends from the groove to a first thread on the screw, extends along the threads for two turns, and extends to a second groove of the plurality of grooves on the drum, is disposed in the second groove on the drum for substantially 360° and extends from the second groove to the thread on the screw from which it departed, extends along the threads for two more turns, and extends to a third groove of the plurality of grooves on the drum, whereby the cable portions between the drum and the screw are each substantially parallel to each other and each thread on the screw between the first groove and the third groove is occupied by the cable, and remains occupied as the screw moves vertically as it rotates.

* * * * *